(12) United States Patent
Taylor et al.

(10) Patent No.: US 7,208,538 B2
(45) Date of Patent: *Apr. 24, 2007

(54) METAL-ACRYLATES AS CURING AGENTS FOR POLYBUTADIENE, MELAMINE AND EPOXY FUNCTIONAL COMPOUNDS

(75) Inventors: Donald W. Taylor, Liberty, MO (US); James W. Freitag, Kearney, MO (US); Don K. Howard, Liberty, MO (US)

(73) Assignee: DeNovus LLC, Moberly, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/729,339

(22) Filed: Dec. 4, 2003

(65) Prior Publication Data

US 2004/0143071 A1     Jul. 22, 2004

Related U.S. Application Data

(60) Provisional application No. 60/430,882, filed on Dec. 4, 2002.

(51) Int. Cl.
*C08K 5/00*     (2006.01)

(52) U.S. Cl. ............... 524/397; 525/530; 525/531; 525/532; 525/502

(58) Field of Classification Search ............... 524/397; 525/530, 531, 532, 502
See application file for complete search history.

(56) References Cited

U.S. PATENT DOCUMENTS

| | | | | |
|---|---|---|---|---|
| 4,073,827 | A | 2/1978 | Okasaka et al. | 260/835 |
| 4,146,698 | A | 3/1979 | Anderson et al. | 526/240 |
| 4,178,423 | A | 12/1979 | Anderson et al. | 526/240 |
| 4,614,674 | A | 9/1986 | Lauterbach | 427/386 |
| 5,150,905 | A * | 9/1992 | Yuki et al. | 473/373 |
| 5,565,535 | A | 10/1996 | Costin et al. | 526/240 |
| 5,656,703 | A | 8/1997 | Costin et al. | 525/531 |
| 5,739,184 | A | 4/1998 | Marbry et al. | 523/457 |
| 5,830,946 | A | 11/1998 | Ozawa et al. | 525/65 |
| 6,100,336 | A | 8/2000 | Sullivan et al. | 525/196 |
| 6,433,098 | B1 | 8/2002 | Brown et al. | 525/274 |
| 6,559,238 | B1 | 5/2003 | Brothers et al. | 525/326.3 |
| 6,849,337 | B2 | 2/2005 | Ohrbom et al. | 428/413 |
| 2006/0235137 | A1 | 10/2006 | Chae | |

FOREIGN PATENT DOCUMENTS

| | | |
|---|---|---|
| EP | 0294062 | 12/1998 |
| JP | 62 172974 A | 7/1987 |
| JP | 09111045 | 4/1997 |
| JP | 04198325 | 9/1997 |
| JP | 09287516 | 10/1997 |

OTHER PUBLICATIONS

New Metal-Containing Acrylaed Oligomers—Impart Excellent Adhesion in Coatings—By Deborah Smith, Sr. Application Chemist, UV/EB Adhesives/Sartomer Co., Exton, PA—pp. 32, 34, 35.
Sartomer Application Bulletin—A Study of (Meth) Acrylate Functional Metallic Monomers as Additives for Improved Metal Adhesion of Coatings.
International Search Report
XP-002273412, Japan.
Unique Metal-Containing Acrylated Oligomers Impart Excellent Adhesion Characteristics—by Deborah Smith, Sr. Application Chemist, UV/EB Adhesives. Sartomer Co., Exton, PA.
Metallic Acrylate Modifier for Epoxy/Amino Systems.
U.S. Appl. No. 10/978,081, filed Oct. 27, 2004, Taylor et al.
U.S. Appl. No. 11/003,758, filed Dec. 3, 2004, Taylor et al.
Synthesis of Zinc-containing Epoxy Resin—Anand, M.; Srivastava, A.K.—J. Appl. Polym. Sci. 1994 51, No. 22, Jan. 10, 1994 p. 203-11.
NDN 131 0103 7855 8. Synthesis of Zinc-containing Epoxy Resin.

* cited by examiner

*Primary Examiner*—Peter D. Mulcahy

(57) ABSTRACT

The disclosure relates to using metal acrylate compounds such as zinc diacrylate (ZDA), zinc dimethacrylate (ZDMA), among others for curing epoxy functional (and other cross-linking compounds), and to compositions containing such compounds. ZDA and ZDMA containing compounds can cure the epoxy component of the compositions while being substantially free of conventional epoxy curing agents.

21 Claims, No Drawings

METAL-ACRYLATES AS CURING AGENTS FOR POLYBUTADIENE, MELAMINE AND EPOXY FUNCTIONAL COMPOUNDS

This Application claims benefit of Provisional U.S. Patent Application Ser. No. 60/430,882, filed on Dec. 4, 2002. The disclosure of that patent application is hereby incorporated by reference.

FIELD OF THE INVENTION

The subject matter of the instant invention relates to metal acrylate curing agents. The subject matter also relates to using these curing agents to prepare useful compositions.

BACKGROUND OF THE INVENTION

Epoxy functional compounds are known in this art and employed in a wide range of applications and formulations. Examples of such applications and formulations comprise automotive and industrial adhesives/sealants, corrosion resistance coatings, films and paints, pre-preg, tapes, hand lay-up structural composites, among other applications.

It is known in this art to employ curing agents to control crossing linking of epoxy functional compounds. Typical epoxy curing ingredients include amine, polyamide, acid functional, dicyandiamide, polysulfides, anhydrides, melamine, urea, and imidizole compounds. Formulations containing such epoxy curing agents can be heat activated. While these curing agents are effective at curing epoxy functional compounds, formulations containing these curing agents can have decreased shelf stability when catalysts are included, e.g., catalysts to decrease activation temperature. Conventional curing agents may also be environmentally undesirable.

There is a need in this art for a curing agent for a polymeric system that results in a cured system having improved shrinkage, clear or no color, lower curing temperature, shelf stability, less charring, increased hardness, among other properties not achieved by conventional curing agents.

SUMMARY OF THE INVENTION

The instant invention solves problems associated with conventional curing agents by employing an effective amount of at least one metal diacrylate. By effective amount it is meant that the amount of metal diacrylate is sufficient to cure at least a portion of the resin composition, e.g., about 1 to about 50 wt. and typically about 5 to about 20 wt. % of metal diacrylate. The metal acrylate can provide other benefits while also acting as a curing agent. While any suitable metal diacrylate can be employed, examples of suitable diacrylates comprise at least one member selected from the group consisting of zinc diacrylate, zinc dimethacrylate, magnesium diacrylate, aluminum diacrylate, aqueous solutions of metal acrylate monomers, among others.

ZDA and ZDMA containing compounds will cure the epoxy component of the formulas while being substantially free of conventional epoxy curing agents. By substantially free of conventional epoxy curing agents, it is meant that an epoxy functional compound (or other compound curable with metal diacrylates) is cured while in the presence of less than 0.1 to about 1.0 wt. % of the following compounds polyamide, peroxide, dicyandiamides, imidizole, amines, urea, among other conventional curing agents. While the instant invention can be practiced in combination with such conventional curing agents, the instant invention obviates the necessity of such compounds, among other benefits.

The metal acrylate systems of the instant invention can be used in a wide range of applications such as automotive sealants, coatings including corrosion resistant coatings, adhesives, pipeline treatment or wrap, among other applications.

DETAILED DESCRIPTION

The instant invention relates to using metal acrylate compounds such as ZDA, ZDMA, mixtures thereof, among others for curing epoxy functional and other cross-linking compounds, and to systems containing such compounds. The instant invention can be employed to cure a wide range of systems. Examples of such systems comprise at least one curable polymer selected from the group consisting of polybutadiene, melamine, isocyanates, epoxy functional compounds such as bis A, bis F, cycloaliphatic epoxy, novolac, epoxy esters, among other systems. The amount of curable polymer will normally range from about 75 to at least about 90 wt. %.

The metal acrylate can have a structure comprising:

wherein M can comprise at least one member selected from the group consisting of zinc (e.g., 2-propenoic acid zinc salt), aluminum, magnesium, tin, copper, nickel, aqueous solutions of acrylate (e.g., aqueous solutions of metal acrylate monomer such as zinc acrylate monomer), among others. While any suitable metal diacrylate or ZDA/ZDMA compounds can be employed, examples of commercially available ZDA/ZDMA products comprise: SR 633, SR634, CN9016, CN 2401, CN2400, PC 300, PRO 5903, and aqueous solutions of zinc acrylate and a non-metallic acrylate monomer such as CD-664 and CD665 all of which are available from Sartomer, Exton Pa. 19341. Non-metallic acrylates (and other compatible organic compounds) can be combined with the metal acrylate in order to modify the system, increase cure rate or hardness, among other beneficial improvements. The particle size of the metal acrylate can be varied thereby permitting production of thin and thick film formulations (e.g., Sartomer® CN2400 and CN 2401 are commercially available as liquids; SR9016 comprises particles ranging from about 40 to about 50 microns and Sr633 comprises particles having a standard 200 mesh). If desired, the metal acrylate can be dispersed or dissolved within at least one carrier prior to compounding into a system, e.g., water and other solvents. When the metal acrylate comprises ZDA/ZDMA, the amount of ZDA/ZDMA ranges from about 1 to about 75 wt. and typically about 5 to about 20 wt. % of metal diacrylate (e.g., about 5 to at least about 10 wt. % of the epoxy functional system).

Without wishing to be bound by any theory or explanation it is believed that suitable metal acrylate compounds may induce co-polymerization of the epoxide with the acrylic group through the nucleophilic Michael Addition reaction. The epoxide curing may begin with an initiation step of a proton addition to the oxirane ring. The proton can be taken from any available donor, e.g. water (moisture), acid, amine or phenolic modifier of the metal acrylate. This first step can produce a reactive intermediate, e.g. $HOCH_2-CH-$, that will further react with the proton donor group, another epoxide or any other nucleophilic reagent, such as acrylic double bonds of ZDA. Acrylic double bonds are the known nucleophiles, e.g. acrylic acid will react with water under basic conditions, $CH_2=CH-COOH+H_2O \rightarrow HOCH_2-CH_2COOH$.

Without wishing to be bound by any theory or explanation, it is believed that the reaction between the activated epoxide and the acrylate could be as follows:

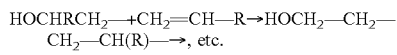

The aforementioned reaction between an epoxy functional compound and a metal acrylate such as ZDA can produce a uniform clear solid formation having an improved thermal stability, e.g., due to the structure of an ionomer with —Zn— in the main polymer chain.

In one aspect of the invention, the inventive curing agent reduces shrinkage in comparison to conventional curing agents. That is, epoxy functional resin compositions were observed to have less shrinkage when compared to the same resin cured with dicyandiamide.

In one aspect of the invention, ZDA/ZDMA cured epoxy systems are more compatible with additives and fillers. This allows greater versatility in the formulation of epoxy, melamine, isocyanurates, polysiloxane and polybutadiene containing systems, e.g., adhesives, sealers, coatings, among other systems. In contrast to conventional curing agents such as dicyandiamides, ZDA/ZDMA are more compatible with acid type, and high pH, among other fillers.

Formulations or systems of the instant invention can be compatible with a wide range of filler materials. Examples of such filler materials comprise at least one from the group consisting of silicates such as calcium, sodium, potassium, lithium, aluminum, magnesium, among others; trihydrates such as aluminum trihydrate; carbonates, bitumins (e.g., gilsonite), clays, nitrides such as aluminum nitride, boron nitride and silicon nitride, carbides such as silicon carbide, silica, among other fillers. In some cases, the filler materials can be employed for modifying the torque tension (e.g., for threaded fasteners), lubricity, wear resistance, colorants, among other surface characteristics. The amount of filler can vary depending upon the desired properties in the cured formulation, and will typically range from about 1 to at least 25 wt %.

Formulations or systems of the instant invention can be employed for obtaining a relatively clear or colorless product. In contrast to conventional curing agents that impart an amber or a dark hue, the inventive formulations can be substantially clear (depending upon the thickness, formulation composition, among other parameters). Color of epoxy formulations was measured in accordance with conventional practices and using the Gardner scale. Gardner color for dicyandiamide cured epoxy was 8–10 whereas Gardner color for same system but cured with ZDA (e.g., commercially available from Sartomer as Sr9016), was about 2 to 4.

The instant invention can be employed for tailoring the curing rate. Conventional curing agents typically have a rapid cure which is undesirable for certain applications. The curing rate of the instant invention can be increased by exposure to higher temperatures, and decreased by lower temperatures. The ability to control curing rate is desirable in that such permits finished coating surfaces to be optimized for smoothness, hardness, gloss, and clarity. Generally a higher curing temperature also results in an increased hardness.

The instant invention can be employed for tailoring the activation temperature of formulations containing metal diacrylate. The activation or curing temperature can range from about 275 to about 425° F. depending upon the thickness, composition of system being cured, method of heating, among other conventional variables. Generally a thinner coating will require less heat and time to cure, and the higher the curing temperature the harder the resultant coating. Additions of titanates, zirconates, among other complexing agents can be used for lowering the cure temperature of the inventive formulations. Generally a relatively thin coating will require less heat and time to cure, and relatively high curing temperatures produce a harder coating. The amount of complexing agent will normally range from about 1 to about 20 wt. % of the composition or formulation. For example, adding 1–5% of a commercially available titanate (Lica 38J supplied by Kenrich) is effective at lowering the cure temperature of formulations containing epoxy functional compounds as the base polymer (e.g., to a cure temperature to less than 250° F.).

In one aspect of the invention one or more additives are included in the inventive formulations. Examples of such additives comprise at least one member selected from the group of fillers, metal powders (e.g., zinc, aluminum, iron, steel, among other metal powders), magnetic materials, ceramic powders, plastic powders, resins (e.g., silicone, silanes, polysiloxanes, etc), among others. Formulations incorporating at least one polysiloxane, at least one metallic powder and at least one ceramic powder can be used when increased temperature resistance is desired (e.g., a coating or formulation formed into a tape and applied onto a pipeline). These additives will normally comprise about 1 to about 25 wt. % of the composition.

In another aspect of the invention, the inventive system is placed (e.g., extruded, dipped, sprayed, etc.), upon a reinforcement. The reinforcement can be located upon or within the inventive blend, e.g., a sandwich or laminate structure. The reinforcement permits easier handling during application and/or manufacture, reduces flow (or sagging) when the inventive system is exposed to increased temperatures, increases tensile strength, improves abrasion resistance, among other characteristics. Depending upon the desired properties, e.g., temperature resistance, the reinforcement material can comprise any suitable material. The reinforcement material normally comprises a scrim, web, matte, mesh, perforated or un-perforated polymer films, an unwoven or a woven assemblage, among other fibrous or film type reinforcements. When employing a scrim as the reinforcement (e.g., a fiberglass scrim having generally round fibers and approximately 12 squares per inch), the reinforcement can have an open surface area of greater than 20 to at least about 80%. When the reinforcement material comprises a perforated polymer or metallic film, the reinforcement material can have an open surface area or porosity of about 1 to at least about 80%. The open surface area also allows a reinforced system to retain its flexibility. Examples of suitable reinforcement materials comprise fiberglass, polypropylene, polyethylene, polyester, fluoropolymers, graphite, plastics, Kevlar®, aluminum, steel, copper, brass, cheesecloth, mixtures thereof, among other materials. Additional examples of reinforcement materials are described in U.S. Pat. No. 6,034,002, issued Mar. 7, 2000 and entitled "Sealing Tape For Pipe Joints", and U.S. Pat. Nos. 5,120,381 and 4,983,449; each of the previous U.S. patents are hereby incorporated by reference. While the reinforcement material can have any suitable porosity or weave density, in most cases the porosity of the reinforcement material is such that the blend is self-adhering (or self-sealing). For example when employing a reinforced inventive composition as a pipe wrap, the composition at least partially passes through the material in a manner sufficient for the blend to adhere to itself as the blend is being wrapped around the pipe, e.g., the blend passes through the reinforcement thereby permitting the blend to bond to itself. The self-adhering characteristic normally obviates the need for primers or pre-treatments, and increases the efficiency with which the reinforced composition covers a surface. In another example, bubbling or blistering of the tape or coating during the cure process can be reduced, if not eliminated, by employing a reinforcement. Reducing bubbling or blistering is particularly desirable if the inventive system is employed as a paintable automotive sealant (e.g., so-called automotive "roof ditch" sealant).

If desired, the reinforcement material can be coated or pretreated with an emulsion, UV reactive (including reactive to sunlight), electron beam active, water or solvent based systems, powder coat systems, or other composition for sizing the reinforcement material, e.g., the reinforcement material is coated with an emulsion for increasing the rigidity of the material thereby permitting the material to be cut to a predetermined size or configuration. The coating can be applied by any suitable methods known in the art such as dipping, laminating, spraying, roller coating, among others. Examples of suitable coatings for the reinforcement material comprise at least one of polyvinyl alcohol, ethylene vinyl acetate, acrylic, urethane or latex emulsions. Another example of a suitable coating for the reinforcement material comprises oligomers, monomers, additives, and a photo-initiator.

In another aspect of the invention, formulations containing the metal diacrylate curing agent have an improved shelf life relative to conventional curing agents. For example, the inventive formulation is stable for at least 120 days without special packaging or refrigeration whereas formulations containing conventional curing agents are typically stable for about 90 days.

In a further aspect of the invention, the inventive formulations or system are employed as a corrosion resistant coating. For example, a zinc plated article or component treated in accordance with the process described in U.S. Pat. Nos. 6,149,794; 6,258,243; 6,153,080; 6,322,687 and PCT Patent Application Publications PCT/US02/24716; PCT/US02/24617 and PCT/US02/24446 (all of which are hereby incorporated by reference), is coated with the inventive system. The coated article has increased corrosion resistance when measured in accordance with ASTM B-117.

The inventive formulation can be employed for improving conventional epoxy functional coatings. The inventive formulation can be used for curing epoxy functional coatings such as e-coats, powder coatings, adhesives, among others. For example, an inventive coating comprising an epoxy powder and a metal diacrylate curing agent (e.g., ZDA and substantially free of dicyanimides), can be applied or sprayed upon a metal article. The metal article is then heated in order to fuse and cure the epoxy coating. In one aspect, a ZDA containing epoxy powder coating is applied onto a pipe, heat cured and then buried. By employing the inventive coating, a tightly bonded coating can be obtained without using curing agents such as dicyanimides.

In another aspect of the invention, the inventive formulations or systems can be modified by an additive comprising cubes or particulates. Particularly desirable results can be achieved by employing cubes comprising nylon 6/12, nylon 6/6 or other commercially available materials (e.g., 0.04/0.08/0.10 inch cubes available commercially from MaxiBlast). The cubes function as an in situ dampener or spacer that increases the compressive strength of the inventive system. When the system is employed as a sealant (e.g., automotive sealant), the cubes reduce the tendency of the sealant to be forced out of a seam or joint formed between at least two members being sealed, e.g., two metal members. That is, the cubes define the minimum distance between two members such that the sealant is retained in the joint. Normally, the amount of this additive ranges from about 0.1 to about 5 wt. % of the system.

The combinations of the instant invention can be prepared by any suitable method such as kneading, batch mixing, extrusion, among other methods. While the above description has emphasized using the inventive composition for automotive and industrial coatings, structural reinforcement, sealants and tapes, the instant invention can be employed in wide array of application such as decorative crafts, glazing, concrete aggregate, gels, among other applications.

The following Examples are provided to illustrate certain aspects of the instant invention and shall not limit the scope of any claims appended hereto. These Examples are provided to demonstrate certain aspects of the claimed invention and shall not limit the scope of any appended claims.

EXAMPLES

Examples 1–8A demonstrate ZDA/ZDMA compositions used for coatings. These compositions were prepared by hand mixing in a beaker under ambient conditions.

| Material | Description | Supplier | wt percent |
|---|---|---|---|
| Example 1 | | | |
| Uvacure 1500 | (Cycloaliphatic) | Radcure | 90% |
| SR 633 | (Zinc Diacrylate) | Sartomer | 10% |
| Example 2 | | | |
| Epalloy 8240 | (Novolac) | CVC specialties | 90% |
| SR 633 | (Zinc Diacrylate) | Sartomer | 10% |
| Example 3 | | | |
| Epon 828 | (Bis A) | Resolution | 90% |
| SR 633 | (Zinc Diacrylate) | Sartomer | 10% |
| Example 4 | | | |
| Epon 872 | (Bis F) | Resolution | 90% |
| SR 633 | (Zinc Diacrylate) | Sartomer | 10% |
| Example 5 | | | |
| Ricon 100 | (Polybutadiene) | Sartomer | 90% |
| SR 633 | (Zinc Diacrylate) | Sartomer | 10% |
| Example 6 | | | |
| Aerotex 3030 | (Melamine) | Cytec | 90% |
| SR 633 | (Zinc Diacrylate) | Sartomer | 10% |
| Example 7 | | | |
| Epon 828 | (Bis A) | Resolution | 90% |
| PRO 5903 | (Magnesium Diacrylate) | Sartomer | 10% |
| Example 8 | | | |
| Epon 828 | (Bis A) | Resolution | 88% |
| PC 300 | Zinc diacrylate | Sartomer | 10% |
| Lica 38J | Titanate | Kenrich | 2% |
| Example 8A powder coating | | | |
| Epon 1001F | (BisA) | Resolution | 90% |
| SR 9016 | Zinc diacrylate | Sartomer | 10% |

Examples 9–10 demonstrate ZDA/ZDMA containing systems that were prepared using commercially available materials (e.g., Sartomer® ZDA's: SR 634, SR 9016, and CN 2400). Example 9 illustrates using the inventive compositions to form a coating and Example 10 illustrates making a tape from the inventive compositions.

Example 9

The formula listed below was prepared and applied by hand onto a steel panel and cured at 400° F. in air for 10 minutes.

| Material | Description | Supplier | wt. % |
|---|---|---|---|
| Uvacure 1500 | cycloaliphatic epoxy | Radcure | 44% |
| Epon 8240 | novolac epoxy | CVC specialties | 44% |
| SR 9016 | Zinc Diacrylate | Sartomer | 10% |
| Z 6040 | silane | Dow | 2% |

If desired, the above formula and other coatings disclosed herein can be employed as a sealer or top coating for metallic surfaces previously treated in accordance with U.S. Pat. Nos. 6,149,794; 6,258,243; 6,153,080; 6,322,687 and PCT Patent Application Publications PCT/US02/24716; PCT/US02/24617 and PCT/US02/24446; hereby incorporated by reference.

Example 10

The inventive compositions can be fabricated into a tape. Such tapes can be used for improving the corrosion resistance of a steel pipeline. An example of such usage is described in U.S. patent application Publication No. U.S.-2002-0013389-A1; hereby incorporated by reference. These tape formulations, which are listed below in Tables 1 and 2, were prepared by mixing in a Baker Perkins double arm mixer.

TABLE 1

| Material | Description | Supplier | wt. % |
|---|---|---|---|
| Vamac G | ethylene acrylic rubber | DuPont | 7.5% |
| ZOCO 104 | zinc oxide | ZOCO | 1.25% |
| Gilsonite MP | gilsonite | Lexco | 12.5% |
| Hubersorb 600 | calcium silicate | Huber | 12.5% |
| SU 2.5 | epoxy | Resolution | 25% |
| Trilene 65 | EPDM rubber | Uniroyal | 37.5% |
| SR633 | zinc diacrylate | Sartomer | 3.75% |

TABLE 2

| Material | Description | Supplier | wt. % |
|---|---|---|---|
| Vamac G | ethylene acrylic rubber | DuPont | 10% |
| ZOCO 104 | zinc oxide | ZOCO | 1% |
| Z 6018 | polysiloxane | Dow corning | 12.25% |
| HM 443 | metallic powder | Hoosier | 47% |
| LERE HH | epoxy/phenoxy | Inchemrez | 20% |
| Viton A | fluoro elastomer | Dupont Dow Elastomers | 5% |
| SR633 | zinc diacrylate | Sartomer | 3.75% |
| Lica 38J | titanate | Kenrich | 1% |

Examples 11–13

Examples 11–13 demonstrate using ZDA containing materials as a reinforcement material, e.g., a material applied onto an automotive component wherein the material becomes rigid after exposure to heating in a paint oven (e.g., refer to U.S. Pat. Nos. 5,040,803; 5,151,327, 5,755,486; all of which are hereby incorporated by reference). These materials comprised modified and unmodified epoxy resins as a base or master batch to which mineral fillers and nitrile rubber were added for dimensional control during forming, handling, vehicle installation, among other purposes. Three materials having the formulations listed in Table 3 below were prepared by mixing in a sigma blade mixer with subsequent heated pressing to obtain a composite comprising a laminate with fiberglass cloth reinforcement. The composite was applied to cold rolled steel test panels and baked at 350° F. for 30 minutes. The flexural strength of the baked test panels was measured on an Instron tensile testing machine in accordance with conventional procedures with the resulting in the data listed below in Table 4.

TABLE 3

| | | | Formulations | | |
|---|---|---|---|---|---|
| Material | Description | Supplier | Example 11 (%) | Example 12 (%) | Example 13 (%) |
| NySyn 33-3 | Nitrile Rubber | Zeon Chemicals | 6.96 | 6.81 | 6.66 |
| Epon 58005 | CTBN Rubber Modified Bis-A Epoxy | Resolution | 9.05 | 8.85 | 8.66 |
| SB 222 | Alumina Trihydrate | J.M. Huber | 10.72 | 10.49 | 10.26 |
| Isolene 400 | Polyisobutylene (Liquid) | Elementis Specialties | 5.57 | 5.45 | 5.33 |
| Epon 872 | Bis-A Epoxy | Resolution | 11.14 | 10.9 | 10.66 |
| InChemRez LER-HH | Phenoxy modified Bis-A Epoxy | Phenoxy Associates | 20.05 | 19.61 | 19.19 |
| Epon 834 | Bis-A Epoxy | Resolution | 15.59 | 15.25 | 14.93 |
| 3M K37 Glass Bubbles | Hollow Glass Spheres | 3M | 22.28 | 21.79 | 21.33 |
| Cab-O-Sil TS720 | Silane Treated Fumed Silica | Cabot | 1.78 | 1.74 | 1.71 |
| Black | Carbon Black | Cabot | 0.89 | 0.87 | 0.85 |
| Sartomer SR633 | Zinc Diacrylate | Sartomer | 2.23 | 4.36 | 6.40 |

TABLE 4

| Flexural Strength (Pounds) | | |
| --- | --- | --- |
| Example 11 | Example 12 | Example 13 |
| 30.61 | 36.52 | 36.78 |

Table 4 illustrates an increase in flexural strength. Without wishing to be bound by any theory or explanation, it is believed that the increase in flexural strength is caused by curing or cross-linking the epoxy resins during the bake process. While there are no adverse affects, Table 4 indicates that no additional flexural strength is achieved by adding greater than about 20 parts (6.5%). In addition to improving the flexural strength, ZDA additions increased adhesion with the cold rolled steel substrate, i.e., all three formulations demonstrated cohesive bonds to the cold rolled steel substrate.

Examples 14–20

Examples 14–20 demonstrate applying the inventive compositions onto a zinc substrate that had been pretreated in a silicate-containing medium (i.e., known as the EMC™ process). The coatings were either mixed by hand or mixed with a high-speed disperser. The pretreatment process is described in U.S. Pat. Nos. 6,149,794; 6,258,243; 6,153,080; 6,322,687 and PCT Patent Application Publications PCT/US02/24716; PCT/US02/24617 and PCT/US02/24446; hereby incorporated by reference. The inventive coatings were applied onto 2"×3" zinc plated substrates. The substrates were cleaned with isopropyl alcohol prior to coating. The substrate was dipped into the coating for approximately 10 sec. The coated substrate was removed and hung vertically. The coating was cured for 20 min. at 340° F. The coating compositions used in Examples 14–20 and evaluation of the coating effectiveness are listed below (CRS=Cold Rolled Steel).

| Material | Example 14 | Example 15 | Example 16 |
| --- | --- | --- | --- |
| Epon 828 (Epoxy from Resolution) | 50 g | 50 g | 20 g |
| Erisys EMRM-20 (Elastomer Modified Epoxy from CVC Specialty) | | 15 g | |
| Cardura E-10P (Glycidyl Ester from Resolution) | 25 g | 35 g | 55 g |
| Veova 10 (Vinyl Ester from Resolution) | 25 g | | 25 g |
| DAPRO U-99 (Interfacial Tension Modifier from Elementis) | 0.2 g | | |
| Z6040 (Silane from Dow Corning) | | 0.2 g | 0.2 g |
| SR 706 (Modified Metallic Diacrylate from Sartomer) | 20 g | 15 g | 10 g |
| Cured Properties | | | |
| Surface Cure | Good | Good | Good |
| Cross Hatch Adhesion: Initial (CRS) | Good: 0% Coating Loss | Good: 0% Coating Loss | Good: 0% Coating Loss |
| Cross Hatch Adhesion: Initial (EMC) | Good: 0% Coating Loss | — | — |

| Material | Example 17 | Example 18 |
| --- | --- | --- |
| Epon 828 (Epoxy from Resolution) | 50 g | 50 g |
| Veova 10 (Vinyl Ester from Resolution) | 50 g | 50 g |
| DAPRO U-99 (Interfacial Tension Modifier from Elementis) | | 1 g |
| Z6040 (Silane from Dow Corning) | 0.2 g | 0.2 g |
| SR 706 (Modified Metallic Diacrylate from Sartomer) | 10 g | 10 g |
| Surface Cure | Good | Good |
| Cross Hatch Adhesion: Initial (CRS) | Good: 0% Coating Loss | Good: 0% Coating Loss |
| Cross Hatch Adhesion: Initial (EMC) | — | Good: 0% Coating Loss |

| Material | Example 19 | Example 20 |
| --- | --- | --- |
| Epon 828 (Epoxy from Resolution) | 50 g | 50 g |
| Veova 10 (Vinyl Ester from Resolution) | 50 g | 50 g |

| -continued | | |
|---|---|---|
| Baghouse Fines (Sodium Silicate) | 3 g | |
| Supernat D10 (Synthetic Amorphous Silicon Dioxide from Degussa) | | 3 g |
| DAPRO U-99 (Interfacial Tension Modifier from Elementis) | 1 g | 1 g |
| Z6040 (Silane from Dow Corning) | 1 g | 1 g |
| SR 706 (Modified Metallic Diacrylate from Sartomer) | 10 g | 10 g |
| Pre-Bake | None | None |
| Surface Cure | Good | Good |
| Cross Hatch Adhesion: Initial (CRS) | Good: 0% Coating Loss | Good: 0% Coating Loss |
| Flexibility | Good: 90° with no cracks but has some signs of stress. Has good adhesion at the bend, also looks good at 180° | Good: 90° with no cracks but has some signs of stress. Has good adhesion at the bend, also looks good at 180° |

While the apparatus, compositions and methods of this invention have been described in terms of preferred or illustrative embodiments, it will be apparent to those of skill in the art that variations may be applied to the process described herein without departing from the concept and scope of the invention. All such similar substitutes and modifications apparent to those skilled in the art are deemed to be within the scope and concept of the invention and the appended claims.

The following is claimed:

1. A heat curable composition comprising at least one epoxy functional resin compound, and about 5 to about 20 weight percent of at least one metal acrylate curing agent which is sufficient to cure said at least one epoxy functional resin compound wherein the composition is substantially free of peroxides, polyamide, acid functional curing agents, dicyandiamide, polysulfides, anhydrides, melamine, urea and imidizole compounds.

2. The composition of claim 1 wherein the composition comprises an automotive sealant.

3. The composition of claim 1 wherein the compound comprises at least one member selected from the group consisting of bis A epoxy, bis F, cycloaliphatic epoxy, novolac compounds and epoxy esters.

4. The composition of claim 1 wherein the composition further comprises at least one filler selected from the group consisting of at least one silicate, silica, trihydrates, carbonates, bitumins, and clays.

5. The composition of claim 1 wherein the composition further comprises at least one additive selected from the group consisting of metal powders, magnetic materials, ceramic powders, plastic powders and resins.

6. The composition of claim 1 wherein the composition further comprises at least one reinforcement.

7. The composition of claim 6 wherein the reinforcement comprises at least one of fibers or film.

8. The composition of claim 1 further comprising at least one complexing agent selected from the group consisting of zirconates and titanates.

9. The composition of claim 1 wherein the metal acrylate curing agent comprises at least one member selected from the group consisting of zinc diacrylate, zinc dimethacrylate, magnesium diacrylate, mixtures thereof and aqueous solutions thereof.

10. The composition of claim 1 wherein the metal acrylate curing agent comprises at least one of zinc diacrylate and dimethacrylate.

11. The composition of claim 9 wherein the metal acrylate curing agent comprises zinc diacrylate.

12. The composition of claim 1 further comprising at least one member selected from the group consisting of silanes and polysiloxanes.

13. The composition of claim 1 further comprises boron nitride.

14. The composition of claim 1 wherein the composition is also substantially free of amines.

15. The composition of claim 3 wherein the epoxy resin comprises cycloaliphatic epoxy.

16. The composition of claim 3 wherein the epoxy resin comprises novalac epoxy.

17. The composition of claim 3 wherein the epoxy resin comprises bis A epoxy.

18. The composition of claim 3 wherein the epoxy resin comprises bis F epoxy.

19. The composition of claim 12 wherein said member comprises polysiloxanes.

20. The composition of claim 8 wherein said complexing agent comprises at least one titanate.

21. The composition of claim 1 further comprising at least one rubber or rubber modified compound.

* * * * *